United States Patent [19]
Dahlström et al.

[11] 3,983,403
[45] Sept. 28, 1976

[54] METHOD AND DEVICE FOR OPTICAL SCANNING OF A SERIES OF TRANSVERSAL DIMENSIONAL VALUES AT A BOARD OR PLANK

[75] Inventors: Claes Dahlström, Vasteras; Börje Bång, Vaxjo; Harding Tannerstål, Soderhamn, all of Sweden

[73] Assignee: Rema Electronic Ltd., Vasteras, Sweden

[22] Filed: June 12, 1975

[21] Appl. No.: 586,403

[52] U.S. Cl. .............................. 250/560; 144/312; 250/223 R; 250/561; 250/571; 356/157
[51] Int. Cl.² ............................................. G01N 21/22
[58] Field of Search........ 250/559, 560, 571, 222 R, 250/223 R, 578, 561; 144/312; 356/156, 157, 158, 159, 160

[56] References Cited
UNITED STATES PATENTS

| | | | |
|---|---|---|---|
| 3,513,321 | 5/1970 | Sherman | 250/560 |
| 3,806,253 | 4/1974 | Denton | 356/157 |
| 3,890,509 | 6/1975 | Maxey | 250/561 |

Primary Examiner—Eugene La Roche
Attorney, Agent, or Firm—Haseltine, Lake & Waters

[57] ABSTRACT

A method and apparatus for optically scanning a board having at least one wane, comprising illuminating the board from at least one side in a direction substantially parallel to a sawn planar face of the board, receiving light reflected by the wane by an objective, and forming, by means of the objective images of at least the terminal parts of selected illuminated transverse zones of the board substantially in the image plane of the objective, placing a plurality of photosensitive elements generating electrical signals in proportion to the light received substantially at the image plane of the objective, forming the photosensitive elements as one rectilinear array of photosensitive signal generators oriented in the direction of the image of the illuminated transverse zone, and moving at least one of the objective and the array of generators relative to the board such that the point of intersection of the imaging axis of the objective and the board scans the board in the longitudinal direction thereof whereby images of different transverse zones of the board are consecutively formed on the array of signal generators.

13 Claims, 4 Drawing Figures

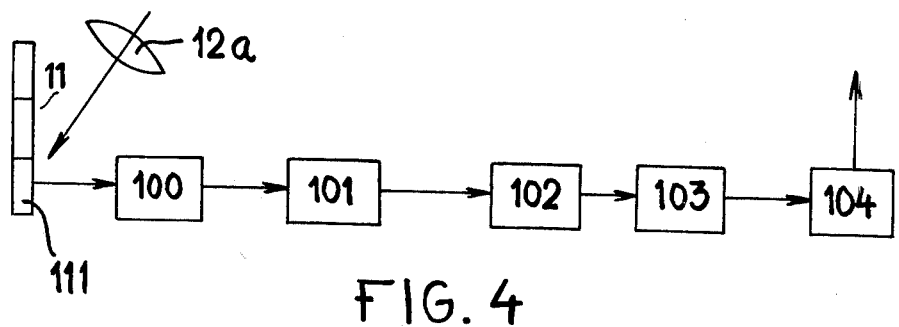
FIG. 4
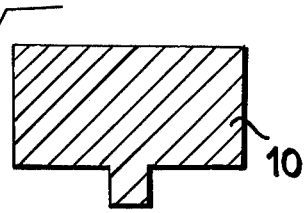
FIG. 3
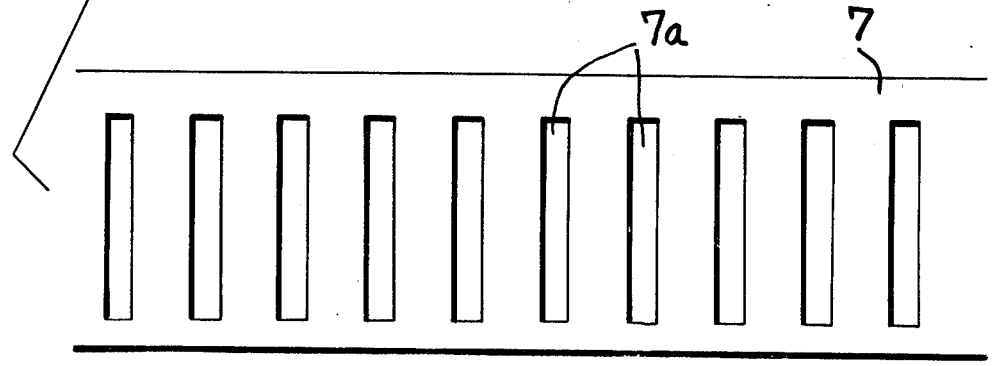

METHOD AND DEVICE FOR OPTICAL SCANNING OF A SERIES OF TRANSVERSAL DIMENSIONAL VALUES AT A BOARD OR PLANK

FIELD OF THE INVENTION

This invention relates to a method and apparatus for optical scanning of a series of transverse dimensional values of a board or plank having one or two wanes for the purpose of processing these values in conventional manner in a computer means to determine the maximum obtainable yield from each board. More particularly, the invention relates to a method in which the wane or wanes are illuminated from the side and substantially parallel to the plane of the sawn face of the board, the light reflected by the wane or wanes being fed to photosensitive means (photodetectors) which upon reception of the light act to generate electric signals which can be fed into the evaluating computer means.

DESCRIPTION OF THE PRIOR ART

A device operating in the above manner has been disclosed in Swedish patent specification No. 307,443 and comprises a perforated rotating drum located close to the board whose width is to be measured. In the inside of the drum is a row of stationary photocells, each of the photocells being aligned with a respective one of the perforations in the drum as they pass through their lowest rotational position. The board itself is made to pass with translatory movement under the drum with its narrower plane sawn face directed upwards, i.e., towards the drum. A wane reflects the light coming from a sidewards placed light source upwards, i.e., towards the rotating drum. Those photocells, which are illuminated by the reflected light which has passed through associated perforations in this row of perforations in the drum, which are in the lowest position, i.e., the operative position, generate electric signals which correspond to the breadth of the wane at the respective transverse section. The total breadth of the board is also of interest, and since boards with one or two clean cut side edges have to be considered, another light source illuminates the board from below, and those photocells which are illuminated by this direct (non-reflected) light, generate, in analogous manner as above, signals which correspond to the breadth of the board with clean cut side edges or to the breadth of the broader plane sawn face of a board with two wanes.

Light screening means coupled to the rotating perforated drum interrupt the light flow from the sidewords light sources each time every other row of drum perforations passes through the lowest position, so that the photocells inside the drum receive light pulses which alternately correspond to the inner and outer boundaries of a wane. The signals from the photocells are evaluated in electronic devices of known kind such that an indication is produced regarding the optimal setting of a cant chipper saw (ganged edger). However, the wane on a board is far from being a mirror surface in the optical sense, where regular light reflection takes place. On the contrary, a considerable scattering of light at reflection must be taken into account. Because of this, the rotating drum must be placed as close as possible to the upper plane face of the passing board, as otherwise even photocells lying "inside" from the wane would be illuminated by obliquely reflected stray rays. Under these circumstances, to prevent blockage of the perforations in the drum by dust or the like, a certain pressure must be maintained in the drum by air supplied from a source of compressed air.

This circumstance, and the necessity of arranging inside a rotating drum a stationary support for the set of photocells makes the construction rather complicated. Other disadvantages include the limitation that measurements are possible only on a moving board, and the circumstance that the light source under the board is exposed to dust and dirt in the same way as the rotating drum.

SUMMARY OF THE INVENTION

It is an object of the present invention to provide a method and apparatus free of the above deficiencies.

In accordance with the present invention, there is provided a method of optically scanning a series of transverse dimensional values of a board or plank, according to which through at least one objective spaced from and opposite the narrower plane sawn face of the board, chosen illuminated transverse zones of the board are consecutively imaged in entirety, i.e., including their both terminal parts, substantially in the image plane of the objective at or in proximity to which one rectilinear array of photosensitive signal generators, such as a rectilinear photodiode raster "generator line," is arranged in the direction of the image of the illuminated transverse zone, the objective and/or the array of generators undergoing such a relative motion with respect to the board that the point of intersection of the imaging or optical axis of the objective with the board scans the board in the longitudinal direction, whereby different transverse zones of the board are consecutively imaged on the array of signal gererators. Hereat, and particularly in the case of a board with one wane and one clean cut side edge, the narrower plane sawn face of the board is preferably also illuminated, so that also the narrower plane sawn face of the board is imaged by the objective, whereat, however, at least either this mode of illumination or the side illumination are effectuated alternately (intermittently). In a similar manner as proposed in the aforementioned Swedish patent specification, final products with a certain remaining wane may be obtained if desired according to the present invention, when the marginal rays in the side illumination mode are directed to a chosen point which - e.g. the midst - the inclined wane.

The present invention is based on the concept that when a board with a wane is illuminated from the side substantially parallel to the plane faces of the board, all light which impinges to the oblique wane is reflected, even if diffusely, while the light which only strikes the plane face parallel thereto is not reflected at all, or at the most to a minimal extent. The difference in intensity between the light reflected on the oblique through dark wane, and the stray light reflected on the planar though relatively light face is in any case sufficiently great to respectively energize or not energize the photodetectors. The length of the non-illuminated central part of the rectilinear array of signal generators, flanked on each side by short illuminated peripheral zones corresponding to the images of both wanes, is therefore proportional to the breadth of the planar face at the respective transversal zone.

If the board however has one clean sawn edge which is not oblique, it may in some cases be difficult to identify this edge only by means of side illumination. For this reason, in the above-mentioned known apparatus, illumination from beneath, i.e., from the broadest side of the board, is effected, so that in a sense a "total shadow" of the board on the signal generator is produced.

According to the present invention, the problem is solved by illuminating the board additionally from above, i.e., on the narrower planar face of the board, and by making this illumination and/or side illumination of the wane intermittent.

When illuminated from above, the planar face as well as a contingent wane reflects sufficient light towards the objective for the signal generators to be energized. In this case there is thus produced a continuous, illuminated zone without any dark interval in the middle on the generator line which is proportional to the breadth of the broader planar face of the board. Because of the intermittent manner of illumination, the signals generated by the photodetectors correspond thus alternately to the minimal breadth (the inner margin of the wane, when only side illumination is effected) or to the maximal breadth (the outer margin of the wane, when only or additionally the illumination from above is effected) of the board. Expressions such as from above, etc., are used in this context only for simplicity, because according to the present invention the apparatus can be installed in any position, i.e., also with the narrower plane face of the board down, etc. The illumination from above may be achieved either by means of the same light source as the illumination from the side, if need be by means of suitable mirror means, or by means of a special light source arranged only for this purpose.

In any case, whether it is a question of boards with two wanes, which in principle do not need any additional illumination from above, or of boards with only one wane, the board must be scanned along its whole length, and successive transverse zones must be measured, i.e., imaged on the generator line. In the above mentioned apparatus, as well as in other apparatus of the prior art, this is achieved exclusively by the board being moved under the measuring device.

This method is, in principle, also possible with the present invention, but the relative movement between the objective and/or the array of photodetectors on the one hand and the board on the other can also be achieved with the board stationary. The face of the board which is turned towards the objective is imaged by the objective in the image plane of the objective. Instead of a planar light-sensitive element such as film, etc., in a conventional camera, one rectilinear array of signal generators, the generator line running transversely of the length dimension of the board is, according to the present invention, arranged in or near the image plane of the objective, e.g., at the place where the optical axis of the objective intersects the image plane. All parts of the image formed outside the generator line are irrelevant, while this illuminated linear zone on the board, which is imaged on the generator line, energizes the generators thereat in one of the above described two manners. The state is comparable to the replacement of a conventional film or plate by a single narrow strip of film material running across the image plane.

According to a first preferred embodiment, the "camera" as a whole, i.e., the objective together with the generator line, can be moved along the entire length of the board, so that images of successive transverse zones of the board will fall on the generator line one after the other.

According to another preferred embodiment, it is however sufficient for the objective itself to be shifted relative to the generator line, which then remains stationary. By the shifting of the objective, the image inside the camera is brought to advance perpendicularly to the generator line, as the point of intersection of the optical axis of the objective with the image plane moves from or towards the generator line in one direction or the other. Considering known optical laws concerning image formation in the case of removal objects, then images in strongly reduced scale are produced, this movement of the objective will be considerably smaller than the movement of the whole camera, which must correspond to the actual length of the board, while the movement of the objective alone will correspond only to the length of the greatly reduced image of the board given by the objective. Exactly the same result is, of course, achieved when the objective remains stationary and the generator line is moved inside the camera perpendicularly to its length relative the objective.

Finally, it is also possible to transfer peripheral image parts on the generator line by letting the optical axis of the objective scan the board from one end to the other, by inclining either the entire camera or the objective alone. Particularly when only the objective is inclined, the generator line will, in the inclined position, lie outside the image plane proper, but at such a short distance therefrom, this is quite irrelevant for the considered purpose.

The apparatus for carrying out the new method is accordingly in its fundamental embodiment characterized by at least one light source operative to illuminate from the side the adjacent wane of a board to be measured, and at least one objective spaced from and opposite the narrower plane face of the board, at or in proximity to the image plane of which one rectilinear array of light-sensitive signal generators, preferably a linear photodiode set, is arranged in transverse direction to the length direction of the board, the objective and/or the generator line on the one hand, and the measured board on the other hand being disposed for relative movement, preferably in such a way that the objective and/or the generator line are displaceable in the length direction of the board.

The intermittent illumination can preferably be achieved in such a way that between a constantly shining and preferably linear light source and the board there is arranged a diaphragm mask with a plurality of slot-formed transparent zones or openings separated by nontransparent zones.

The above described scanning movements are realized by transmitting alternately an image of a transverse zone of the board lying behind a transparent zone and one lying behind a non-transparent zone of the diaphragm mask to the generator line. Although both modes of illumination may be made intermittent, it is sufficient to do so only with the illumination from above.

BRIEF DESCRIPTION OF THE DRAWING

FIG. 3 is a detail view of a diaphragm mask, and FIG. 4 is a flow diagram of the method according to the invention.

DETAILED DESCRIPTION

Figure 1:
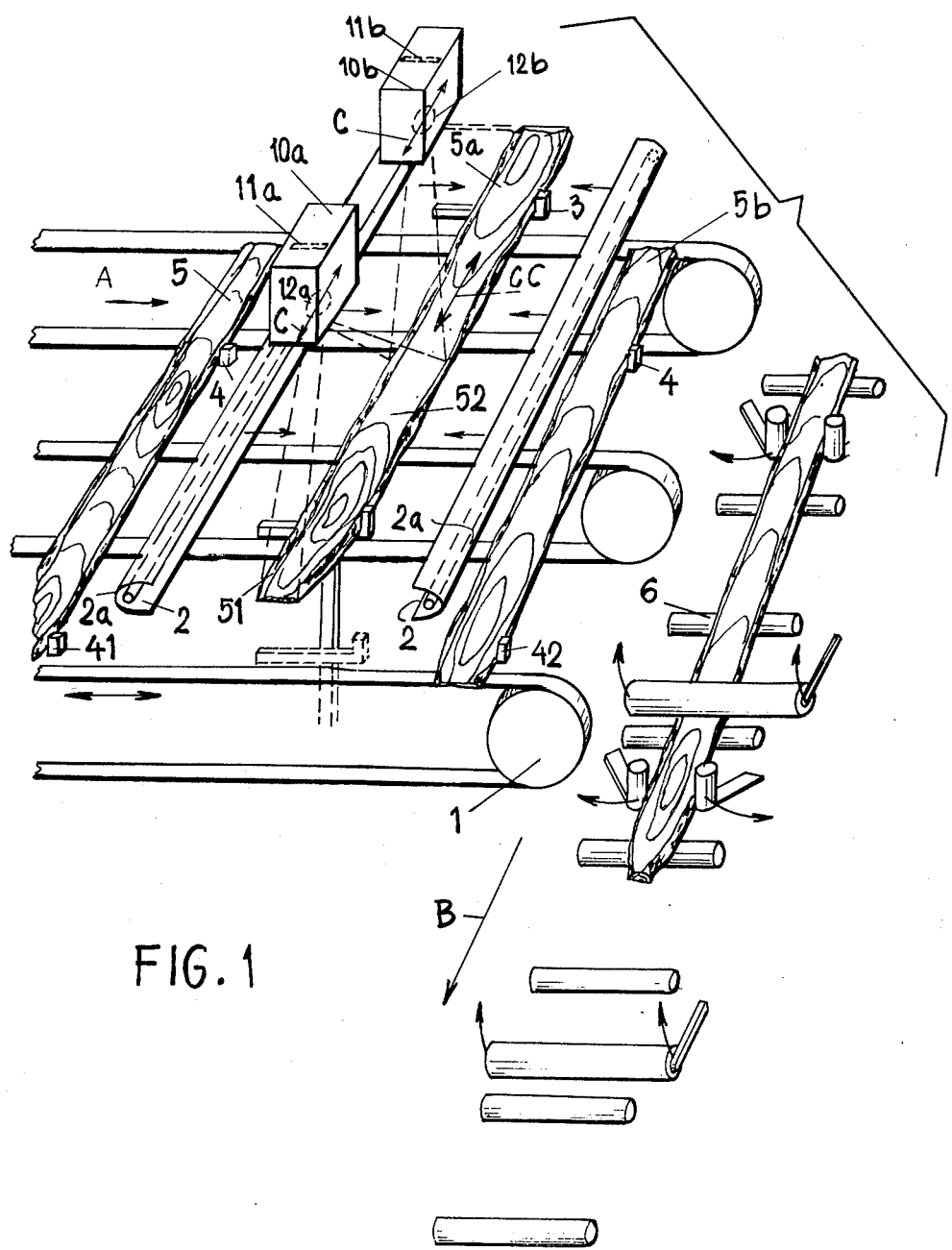
FIG. 1 is a diagrammatic isometric view of apparatus according to the invention.

Referring to FIG. 1 therein is shown a board 5 supported on a first conventional conveyor 1 and advanced transversely in the direction of arrow A to a measuring station which is disposed after a stop 41 and provided with an elevating means 3. The elevating means 3 receives the board and elevates it from the plane of the conveyor to an elevated measuring position 5a.

The feed-out of the board (position 5b) from the measuring station is regulated by a second stop means 42, whereafter the board is carried away for further treatment by a second conventional conveyor 6 in the direction of arrow B.

Substantially at the level of the board at its measuring position 5a are linear light sources 2 disposed on both sides of the board to illuminate its wanes 51. The light sources 2 are provided with reflectors 2a of parabolical cross-section located above the board 5a at a safe distance from its narrower plane face 52, are two stationary cameras 10a, 10b so disposed that their fields of view at least contact one another in the measuring plane, i.e., at the position 5a. Each camera 10a, 10b, consists principally of an objective 12a, 12b and a linear photodiode set 11a, 11b disposed substantially at the image plane of the objective. The photodiode set extends transversely of the length direction CC of the board. The objectives 12a, 12b are displaceable, in the otherwise stationary cameras 10a, 10b, in the direction of the arrows C, i.e., parallel to the longitudinal direction CC of the board. Objective 12a, for example, forms images of the forward half of the board 5a in the image plane of the objective, i.e., the upward facing "bottom" of the camera 10a. But only one small transverse strip of this image plane is light-receptive, viz., the generator line 11a.

Thus only such narrow transverse zone of the board 5a, the image of which is formed just on the generator line 5a, is defacto measured at one instance. The image of the respective transverse zone on the generator line is, however, not an uninterrupted luminous trace, but two luminous regions spaced a certain distance from one another. Light from the left hand luminous source 2 impinges to the oblique left hand wane 51 of the board 5a, and is thereat diffusely reflected towards the objective 12a and focussed by it near the right hand end of the generator line 11a, to form thereat an image of the said wane. Analogously, although with reserved side markings, an image of the right hand wane is formed. Substantially no light is reflected towards the objective 12a by the planar upper face 52, because light from both the lateral light sources 2 passes parallel to said face. Thus the image of this planar face 52 on the generator line is a dark interval between the two peripheral images of the both wanes. The distance between the two most marginal illuminated photocells thus corresponds to the maximum breadth of the board (i.e, narrower planar face plus both wanes), in the respective transverse zone, while the distance between the two innermost illuminated photocells corresponds to the breadth of the narrower planar surface alone at the respective transverse zone. The latter value, and eventually both values, are important parameters for the computer means which calculates the optimal setting of a cant chipper saw or the like. Thereafter, a relative displacement of the objective takes place and the image of another transverse zone of the board 5a falls on the generator line 11a. The other camera 10b operates, of course, in the same manner. It is obvious, that also some of the other earlier mentioned modes of scanning, i.e., moving the generator line along the image or swinging, i.e., tilting the objective or the whole camera, can be used in this embodiment. The arrangement shown in Fig. 1 is exclusively for the measurement of boards with two wanes. By use of an intermittent illumination of the upper face of the board, it can easily be adapted for measuring boards with one or even two clean cut edges, i.e., perpendicular edges. Such an illumination can be achieved, for example, by means of light sources (not shown) arranged side by side with the cameras 10a, 10b and alternately switched on and off.

Figure 2:
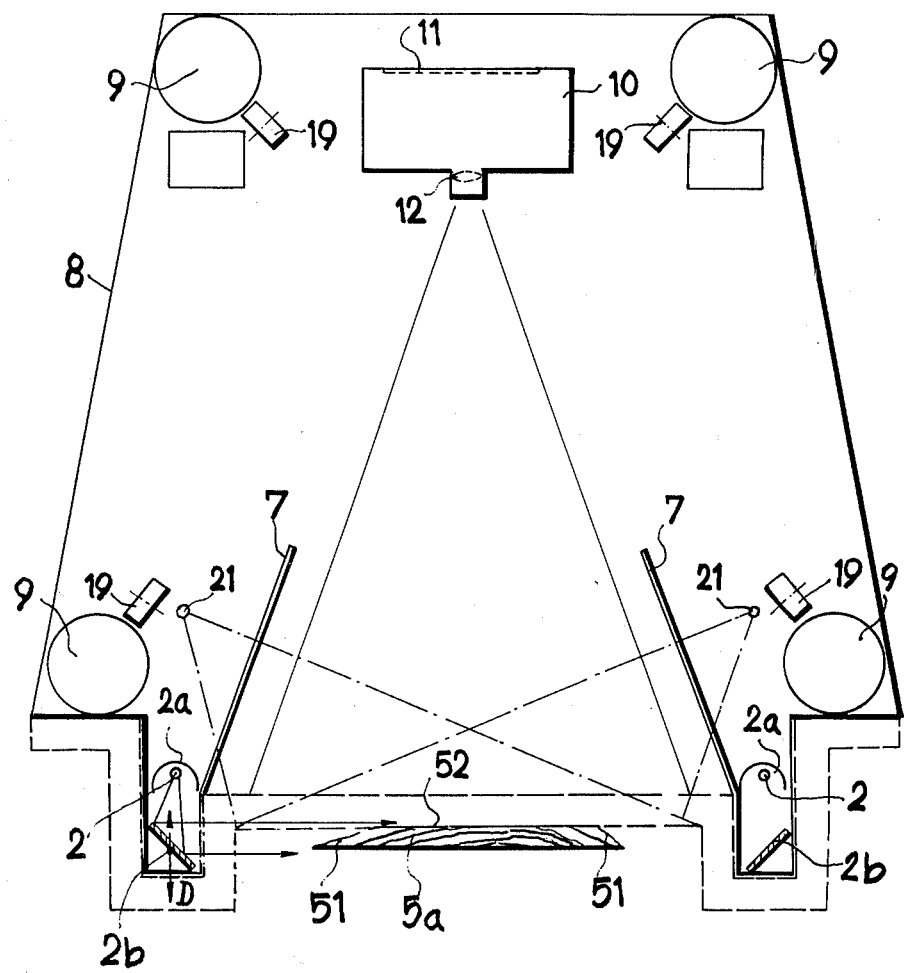
FIG. 2 is a front elevational view in larger scale of another embodiment of the invention.

Another embodiment of the invention, also presenting another solution of the intermittent illumination, is shown in Fig. 2. Therein, a sole camera 10 is disposed inside a cover 8 which, by means of diagrammatically shown guiding means 9, and castors 19, can move in the direction of the arrow CC in Fig. 1 along the entire length of the board, i.e., perpendicularly to the plane of the drawing. Above the two light sources 2, another pair of light sources 21 is disposed. The light sources 2 are operable to illuminate the wanes 51 of the board in the same manner as in the device according to Fig 1, but this illumination is now achieved with the aid of plane mirrors 2b. The double arrow D at the left hand light source 2 shows how, by height adjustment of the mirror 20b, the limit point of illumination on the wane 51 can be chosen. By lowering the mirror 2b from the position shown in Fig. 2, the highest light ray will impinge to the wane first, e.g., in mid height. Thus the upper half of the wane will be "optically added" to the planar face, as it will not reflect any light.

The light sources 21 are intended to illuminate the narrower plane face 52 of the board from above, without regard to the fact that the wanes 51 also are illuminated at the same time. To achieve an intermittent character of this illumination from above, a diaphragm mask 7 is placed between the light sources 21 and the board, as is shown in greater detail in Fig 3.

The diaphragm mask 7 is substantially constituted as a longitudinal plate provided with transparent zones or openings 7a. The masks 7 are stationary relative to the board and do not take part in the movement of the cover 8. The light sources 2, 1 can either be linear, in which case they also do not take part in the movement of the cover 8, or they may be conventional glow lamps attached to and movable with cover 8. From Fig. 2 of the drawing it is further evident that in principle, only one light source is needed for both modes of illumination. One has only to assume that the light sources 2 with their screens 2a are omitted so that the light from the light sources 21 can on the one hand intermittently illuminate the plane face 52 of the board through the diaphragm mask 7, and on the other hand constantly illuminate the wanes 51 via the mirrors 2b. When boards with two wanes are measured, only side illumination is necessary, as already has been explained.

The difference between the embodiment of Fig. 2 and that according to Fig. 1 is in the optical sense only insofar that instead of moving only the objective a short distance along the image to get various transverse zones imaged on the generator line, the whole length of the board for the same purpose. It is however obvious, that the double illumination can be also used with a scanning arrangement according to Fig. 1 and a single illumination with a scanning arrangement according to Fig. 2. With regard to image formation in side illumination, the state is exactly the same as described in connection with Fig. 1. From Fig. 2 it is particularly clearly apparent that no light from side illumination can be reflected towards the objective 12 by the planar face 52. It is also clearly evident as regards the illumination from above, light reflected on the wanes 51 as well as on the planar surface 52 is reflected towards the objective 12. The image on the generator line 12 will thus have the form of an uninterrupted luminous line (possibly with more weakly illuminated terminal parts). When the alternation of the illuminating modes however is arranged such that the side illumination is on constantly, and the illumination from above intermittently, then no weekly illuminated terminal parts will come about.

With a board having two wanes, the image from illumination from above would deliver no further information than the image effective by side illumination, because the distance between the two most marginal illuminated photocells would be the same in both cases. With a board with a single wane, however, (or with no wane at all, for that matter), the image resulting from the illumination from above replaces the missing terminal point on the side where there is no wane and therefore no reflection in side illumination.

The possibility to choose the point on the wane to which the highest light ray impinges in side illumination, as described in connection with the movable mirror 2b, makes it possible to replace the actual breadth of the narrower planar face 52 by an imaginary greater value, viz, this actual breadth plus the adjacent non-illuminated part of the wane. This procedure is useful when a certain residual wane is tolerated, which often is the case in practice.

In connection with FIG. 3, where camera 10 is shown at right angles to the position of camera 12 in FIG. 2, it is obvious that when the transverse zone imaged on the generator line lies behind an opening 7a in the mask 7 (which substantially is the case in FIG. 3), then an image in illumination from above (and eventually at the same time also in side illumination, as shown in FIG. 2) comes about. When the camera 10 or 12 is then moved one-half a diaphragm interval, a transverse zone lying behind a non-transparent part of the mask 7 is imaged. The illumination from above, and only this illumination is at such a position shielded by the mask, and consequently only an image in side illumination comes about. Thus, by moving the camera in half interval steps, there is obtained combined illumination from above and the side in alternation with side illumination only of the consecutive imaged transverse zones.

The working method of the whole device will become evident from the flow diagram according to FIG. 4 where it is schematically shown how a photodiode 111 in a photodiode line 11 receives light from the objective 12a. The photodiode line 11 extends transverse of the length direction of the board, as shown in Fig. 1. With side illumination, only the oblique wanes reflect enough light towards the objective 12a so that the photodiodes on which the respective images fall can be considered as illuminated. Thus although the objective forms an image of the respective transverse zone of the board in its entirety on the photodiode line, the photodiodes lying between the two peripheral zones, on which the images of the wanes are cast, receive practically no light because the planar face, imaged on these more central photodiodes of the array, reflects practically no light at all from side illumination, as has been explained previously.

By the illumination from above, practically all of the illuminated transverse zone reflects sufficient light so that each photocell "covered" by the image formed by the objective can be considered as illuminated. After effecting a movement between at least one of the objective and the array of generators relative to the board, in any of the above described ways, the same procedure is repeated at another transverse zone of the board, now imaged on the generator line. In each thus illuminated photodiode cell, the photocurrent generated by the illumination is accumulated. Electronic scanner 100 scans all the cells and an electric pulse proportional to the product of illumination multiplied by time, i.e., to the accumulated current, is generated. This pulse is fed to a signal treatment unit 101 where the level of the signal is compared with a predetermined value, whose magnitude is sufficiently high so that scattered light from the planar face in side illumination never can reach it. If the pulse exceeds this predetermined value, the point of the object (board), the image of which on the photodiode line has caused the pulse, is considered illuminated. The signal treatment under 101 also makes sure from which photodiode cell the pertinent pulse has come and thus effectuates the measuring operation in the proper sense of the word, the generation of the signals being in this case comparable to a sensing.

From the signal treatment unit 101, the information concerning the transverse coordinates of the illuminated and non-illuminated points on the measured object is transferred to a memory unit 102 and therefrom to a processing or evaluation unit 103 such as a computer. The evaluation unit 103 treats the fed-in information according to a preestablished program and controls a control unit 104 which in turn adjusts the alignment of the board and the setting of a ganged edger (not shown).

When measuring boards with two clean sawed edges, which seldom occurs in practice, one proceeds in the same manner, but instead of the continuous side illumination, only continuous illumination from above is used. In practice, however, the measurement of boards with one wane and one cleanly cut side edge as well as an arrangement in which the measuring device for measuring boards with two wanes can measure with equal precision with one wane and one cleanly cut edge is desirable. Then the two modes of illumination are used, in which at least the illumination from above has to be intermittent.

What is claimed is:

1. A method of optically scanning the dimensions of a plurality of selected transverse zones of a board having two sawn planar and parallel faces, at least on one side said faces being connected by an oblique wane, so that one of the said planar faces is narrower than the other, said method including the step of:
    transporting the board to a scanning station and stopping it there in motionless position;
    illuminating at least a first selected transverse zone of the board from each side where the board has an oblique wane by a beam of light substantially parallel with the planar faces, so that on each existing wane a maximum and on each planar face a minimum of light is reflected;

receiving the reflected light by at least one objective lens disposed at a location spaced from and opposite the narrower planar face;

forming by means of said objective lens an optical image of the light reflecting parts of the board on a rectilinear array of photosensitive pulse generators disposed behind the objective lens substantially in the image plane thereof and parallel with the selected transverse zone of the board;

transmitting the pulses generated by said generators in the array which have been activated by incident light to computer means for processing;

consecutively moving at least one of the objective lens and the array relative to the motionless board in such a way that an optical image of another selected transverse zone of the board is formed on the array; and repeating the scanning and transmitting steps.

2. A method as claimed in claim 1 comprising vertically adjusting the position of the illumination from the side.

3. A method as claimed in claim 1 adapted for application to a board having one wane and one clearly sawn edge and further comprising illuminating the narrower planar sawn face of the board and receiving light reflected by the narrower planar sawn face and the one wane by the objective and the array of generators, at least one of the illumination from the side and the illumination of the planar sawn face being effected intermittently.

4. A method as claimed in claim 3 wherein the intermittent illumination is effected by moving the objective relative to the board and positioning prior to scanning a stationary diaphragm mask between the source of illumination and said board.

5. Apparatus for optically scanning the dimensions of a plurality of selected transverse zones of a board having two sawn, planar and parallel faces, at least on one side said faces being connected by an oblique wane so that one of the said planar faces is narrower than the other, said apparatus comprising:

a scanning station for the board;

transport and stopping means for transporting the board to the scanning station and stopping it there in motionless position;

at least one light source for each wane of the board and operable to illuminate at least a selected transverse zone of the board from the side substantially parallel with the planar faces of the board;

at least one objective lens disposed spaced from and opposite the narrower plane sawn face of the board when in its immobilized position in the scanning station;

for each objective lens one rectilinear array of photosensitive pulse generators disposed behind the objective lens and substantially in the image plane thereof and parallel with the selected transverse zone of the board;

electrical circuitry means for transmitting the pulses from the generators to a computer means; and means for moving at least one of the said objective lens and said array of signal generators relative to said board in such a way that an optical image of another selected transverse zone of the board is formed on said rectilinear array.

6. Apparatus as claimed in claim 5 adapted for application to a board having one wane and one cleanly cut edge, comprising a second light source positioned to illuminate the narrower plane sawn face of the board such that light reflected on this surface reaches the objective and means for intermittently interupting at least one of the light sources.

7. Apparatus as claimed in claim 5 comprising a camera, and one of said objective and the set of signal generators being movably arranged in said camera which in turn is stationary relative to the board while the other is stationarily arranged in said camera.

8. Apparatus as claimed in claim 5 wherein said light source is linear and parallel to the longitudinal direction of the board.

9. Apparatus as claimed in claim 5 comprising a mirror disposed between the light source and the board for reflection of light from said source for side illumination.

10. Apparatus as claimed in claim 5 adapted for application to a board having one wane and one cleanly cut edge, wherein said light source is adapted to also illuminate the narrower plane sawn face of the board, the light reflected by this face being received by the objective, at least one of the two modes of illumination being intermittent.

11. Apparatus as claimed in claim 10 further comprising means for intermittently effecting illumination nin one of said modes comprising at least one longitudinal diaphragm mask having a plurality of transparent zones placed between the light source and the board.

12. Apparatus as claimed in claim 5 comprising a camera, said objective and said set of signal generators being stationary mounted relative to one another in said camera, which in turn is movable relative to the board.

13. Apparatus as claimed in claim 12 comprising means guidably supporting the camera for movement along the entire length of the board.

* * * * *